April 5, 1960
C. W. MERTZ
2,931,433
EVAPORATION PROCESS CONTROL BY VARIATION
IN PROCESS MATERIAL DIELECTRIC CONSTANT
Filed Dec. 27, 1955
3 Sheets-Sheet 1
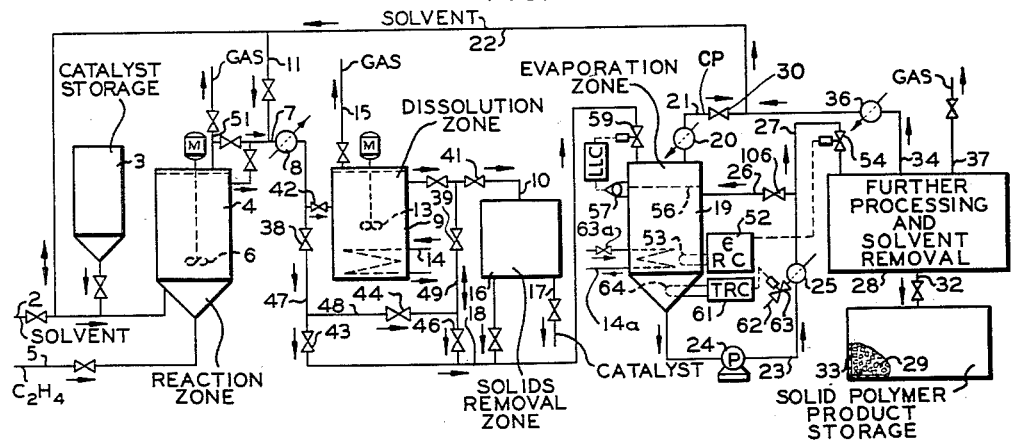
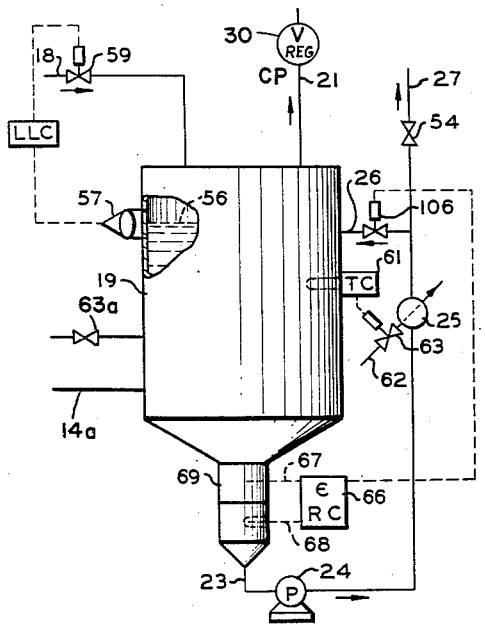
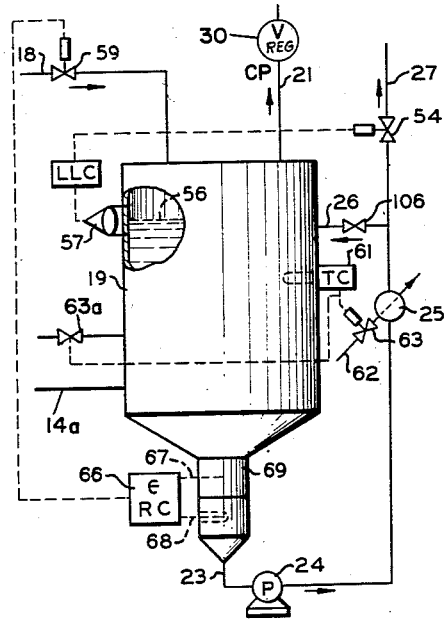
INVENTOR.
C.W. MERTZ
BY *Hudson & Young*
ATTORNEYS INVENTOR.
C. W. MERTZ
BY *Hudson & Young*
ATTORNEYS

2,931,433

EVAPORATION PROCESS CONTROL BY VARIATION IN PROCESS MATERIAL DIELECTRIC CONSTANT

Clyde W. Mertz, Bartlesville, Okla., assignor to Phillips Petroleum Company, a corporation of Delaware Application December 27, 1955, Serial No. 555,648

19 Claims. (Cl. 159—47)

This invention relates to evaporators, and systems and processes employing the same, in which the operation of the evaporator, and the quality of the effluent therefrom, are controlled as a function of the dielectric constant of the liquid in a selected portion of the evaporator system. In one aspect it relates to continuous evaporation processes. In another aspect it relates to the production and/or concentration and/or recovery of normally solid polymers. In another aspect, it relates to the concentration and/or recovery of a normally solid polymer from a solution thereof in a solvent. In another aspect, it relates to a novel method for the production of a substantially solvent-free polymer.

Several different processes are known in the art for the production of normally solid polymers, such as polyethylene, polybutadiene, and polystyrene. In many of the known processes, the polymer is initially obtained in the form of a solution in the solvent and must be recovered therefrom. Concentration and/or recovery can be effected by different methods, including solvent evaporation which concentrates the polymer in the solution, which may then be cooled to cause precipitation of the polymer, which is subsequently recovered by filtration, or other well known processes of the prior art including vacuum flashing, extruding and drying, or centrifugal separation, etc., which are not shown in detail in the present specification. The present invention is directed to control of the solvent evaporation step, which can be a batch operation but which preferably is a continuous process. Obviously the present invention can be applied to any evaporative concentration process, at various pressures from a vacuum to high super atmospheric pressures, in the concentration of milk, latex, sugar solutions, or any other slurry, solution, or dispersion, provided the solvent and the dissolved or suspended material have different dielectric constants. However, the present invention finds particular utility in providing a process by which polymer can be recovered from a solution thereof by vaporization of the solvent without thermal decomposition of the polymer, or deposit of a fouling coating on the apparatus, or excessive foaming, bumping, and boiling over of polymer into the solvent outlet of the evaporator, which decomposition and other listed difficulties have often occurred and have been unsolved problems of the prior art when manual control of the evaporator, temperature control, or control by specific gravity, was relied upon.

Therefore the preferred embodiment of the invention as disclosed herein, is the application of the invention to polymer solution concentration, especially polyethylene polymers, more especially those made by such processes as disclosed in the copending application of M. R. Cines, Serial No. 496,515, filed March 24, 1955.

One object of the present invention is to provide an evaporation system, and process of controlling the same, in which the operation of the evaporator is controlled as a function of the dielectric properties of the liquid at a selected point in said system.

Another object is to control an evaporator used to separate solvents from polymer solutions.

Another object is to minimize thermal decomposition of polymer, fouling deposits, foaming, bumping, and boiling over of polymer into the solvent outlet of a polymer solution evaporator.

Other objects are to provide suitable evaporator control systems including suitable electrical dielectric measuring systems to accomplish the above objects. Numerous other objects and advantages will become obvious to those skilled in the art upon reading the accompanying specification, claims, and drawings.

The recovery process of this invention is particularly applicable to the recovery of a polymer produced in a process of the type disclosed and claimed in the co-pending application of Hogan and Banks, Serial No. 476,306, filed December 20, 1954, now abandoned in favor of continuation-in-part copending U.S. Patent 2,825,721 of March 4, 1958, wherein an aliphatic 1-olefin having a maximum chain length of 8 carbon atoms and no branching nearer the double bond than the 4-position is subjected to polymerization conditions in the presence of a catalyst comprising chromium oxide, of which a substantial portion of the chromium is hexavalent, associated with at least one oxide selected from the group consisting of silica, alumina, zirconia and thoria. The chromium (Cr) content of the catalyst is ordinarily a minor proportion, preferably from 0.1 to 10 weight percent. Polymerization is ordinarily conducted at a temperature in the range 150 to 450° F. The reatced olefin, e.g., ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane, and paraffinic hydrocarbons both normal and isoparaffinic having from 3 to 12, preferably 5 to 12, carbon atoms per molecule, e.g., normal hexane, isoheptanes, normal octane and 2,2,4-trimethylpentane. This obviously includes mixtures of these materials, as such mixtures still have a boiling point range spaced from the boiling point of the polyemr, and a joint dielectric constant and individual dielectric constants all spaced from the dielectric constant of the polymer by a suitable amount. The reaction can be conducted as a fixed-bed reaction but is, in many cases, conducted with the catalyst in comminuted form in suspension, as a slurry, in the hydrocarbon solvent. The effluent withdrawn from the reatcor comprises a solution of polymer in the solvent, and when a slurry or suspended catalyst is used, the effluent comprises a solution of the polymer in the solvent, suspended catalyst with undissolved polymer adhering thereto, and, in many cases, small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point, if desired, and it is ordinarily the practice to adjust the concentration of polymer in the solution to a value in the range of approximately 2 to approximately 10 weight percent. The solution is then filtered to remove the suspended catalyst and a solution containing from 2 to 10 weight percent of polymer in the solvent is thus obtained from which the polymer is recovered. The method of this invention is particularly applicable to the recovery of polymer from such a solution, and particularly to such a solution of a polyethylene. Polymers so recovered are useful for fabrication into pipe, tubing, electrical insulation, and water-resistant wrappings, as more fully set forth in the cited application.

According to one modification of this invention, approximately 25 to 75 percent of the solvent is vaporized in the first stage, and most or substantially all of the remaining solvent is vaporized in the final stage, or stages.

When the invention is applied to a solution of polyethylene in, for example, 2,2,4-trimethylpentane or cyclohexane, as previously indicated, it is preferred that the solution fed to the first step of the process have a polyethylene concentration in the range 2 to 10 weight percent, but in commercial operations it generally runs from 3 to 3.5% and hardly ever over 5%. The first step concentrates this solution to a preselected polyethylene concentration of a single percentage lying in the range 8 to 15 weight percent, it being preferred at present to select 10% concentration. The final stage, or stages, may decrease the solvent concentration to less than 1 weight percent in the product polymer.

The melting point of the polymer will vary, depending on the physical and chemical nature and origin of the polymer. Polyethylenes ordinarily range in melting point from about 210 to about 260° F. The polyethylenes prepared by the process of Hogan and Banks (cited) ordinarily have melting points in the range 240 to 260° F. but can have melting points outside this range.

In the present invention, the first step in the recovery process is an evaporation conducted at temperatures in the range 250 to 350° F. and above the melting point of the polymer and the normal boiling point of the solvent, and a pressure in the range 0 to 100 p.s.i.g. For example, with cyclohexane as the solvent, it is preferred to operate at about 275° F. when operating at 45 p.s.i.g. to about 300° F. when operating at 65 p.s.i.g. In some species of the invention the temperature is varied above and below the selected median temperature, to vary the concentration of the effluent.

In the application of the present invention to a complete solid polymer producing system, obviously it is necessary to further concentrate and remove solvent from the 10% concentration effluent polymer solution from the above described first evaporation step. Obviously this may be done in the manner disclosed in said co-pending application of M. R. Cines, but it also may be done by passing the effluent polymer solution from the first evaporation zone through one or more further evaporation zones of the same mechanical construction (not shown), and/or through a vacuum flash zone of the type shown in said Cines application (not shown). Or the 10% solution may be taken directly from the first evaporation zone and cooled to precipitate the solid polymer, which is then filtered to remove same from the cooled solvent.

The solvent vaporized in the three steps according to this invention can be condensed, combined, and recovered, for example, for recycling to the polymerization reaction.

In the drawings—

Figure 1 is a diagrammatical view of a complete production, concentration, and recovery system for the manufacture of normally solid polymers containing therein a preferred embodiment of the present invention applied to an evaporation zone thereof.

Figures 2, 3, 4, 5, 6 and 7 are diagrammatic views respectively of six other species of evaporation zone control systems embodying the present invention, each of which may be substituted for the control system shown in Figure 1.

Figure 8:
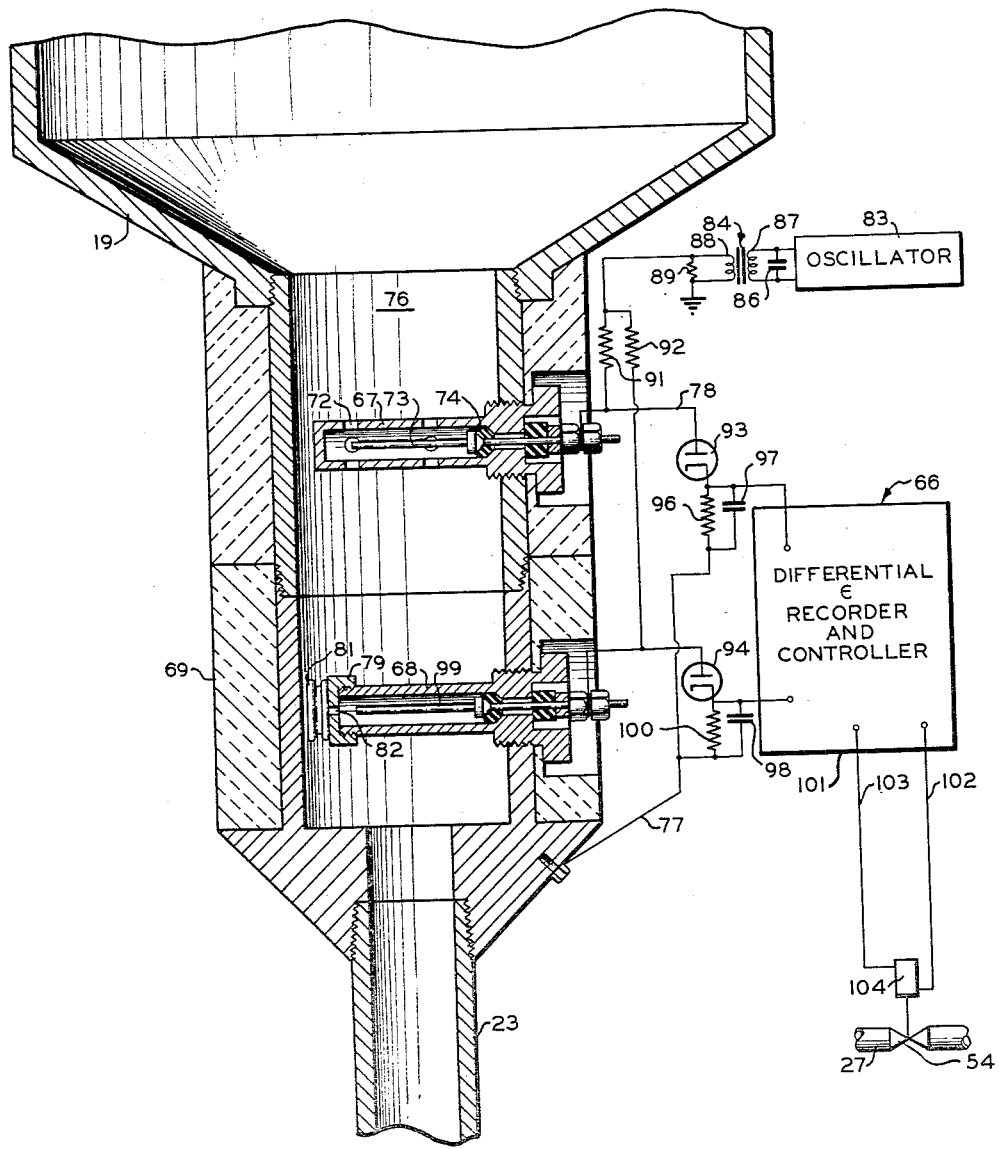
Figure 8 is an enlarged cross-sectional view of the preferred embodiment of the dielectric cells which is employed in all of Figures 2–7, combined with an electrical circuit diagram of a preferred electrical differential dielectric recorder and controller suitable for use in any of the preceding figures.

In Figure 8, in order to measure the dielectric properties of the liquid passing from the bottom of evaporator 19 into pipe 23 it is preferred to position the recorder and controller generally designated as 66 with its dielectric pick-ups 67 and 68 in a heat insulated section 69 of pipe 23 in order that the temperature in pick-up 68 will be as close as possible to that of 67.

Figure 5:
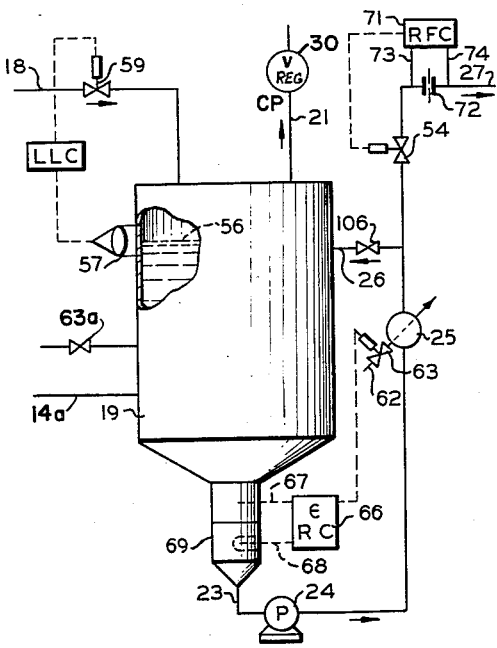

The specific recorder and controller 66 will be noted to be substantially the same as that shown in Figures 1 and 5 of co-pending Serial No. 376,960 of James R. Parsons, filed August 27, 1953, now U.S. Patent 2,904,751 of September 15, 1959, so it is believed unnecessary to go into great detail in describing the same.

It will be noted that pick-up 67 comprises an electrical condenser having two plates, the first being the outer tube to which numeral 67 is applied having opening 72 therein to allow it free passage of liquid therethrough, the second plate being rod 73 which is centrally located in tube 67 and insulated therefrom by suitable electrical insulation means 74, such as silicone rubber, a synthetic material the molecules of which are long chains of silicon-oxygen units with two methyl radicals attached to each silicon atom. Silicone rubber is noted for its retention of its elasticity at temperatures as high as 570° F., and it is not affected by the liquids involved in the process as described above, or the temperature of about 300° F. at this point of said process.

Another suitable material is "Teflon," which is the registered trademark name of a plastic consisting essentially of a tetrafluoroethylene polymer. "Teflon" resists the attack of all materials, except molten alkali metals, and can be employed over a temperature range of −100° F. to 450° F. Other suitable materials can be chosen depending on the liquids which are going to contact the same and the temperature involved.

Condenser unit 67 is screwed into the pipe 76 which acts as a ground to the outer plate 67 through ground wire 77, and inner plate 73 is connected to lead 78.

It will be noted that electrical condenser 68 is of identical construction as 67 except that holes 72 are omitted and a removable cap 79 is provided having an expandable bellows section 81 in communication with the interior of 68 through a central perforation 82 in cap 79. This enables condenser 68 to be filled with a standard or comparison liquid, preferably a sample of the desired concentrations of the same polymer in the same solvent as it is desired to produce as the effluent of evaporator 19, and this sample is sealed inside of 69 by cap 79, and expansion and contraction of the same because of temperature changes is provided for by flexible metal bellows 81.

The capacitance of probe 67 is compared directly with the capacitance of reference probe 68, which as described above is filled with a material similar to that under analysis. In this circuit it is preferred to use an oscillator 83 producing an alternating current of about one kilocycle which is fed into the circuit 66 through a transformer generally designated as 84, preferably comprising a condenser 86, a primary coil 87 and a secondary coil 88 in parallel with a resistance 89. One end terminal of coil 88 is grounded and the other terminal is connected through suitable resistances 91 and 92 to the anodes of diodes 93 and 94, respectively. The cathodes of these diodes are grounded through resistances 96 and 100 shunted by capacitances 97 and 98, respectively, through wire 77 and pipe 23 back to the outer cases of condenser 67 and 68. Electrode 73 of probe 67 is connected to wire 78 to the anode of diode 93, and electrode 99 of probe 68 is similarly connected to the anode of tube 94. The cathode of diode 93 is connected to one input terminal of a recorder and controller instrument of conventional construction 101 and the cathode of diode 94 is similarly connected to the second input terminal of said controller 101. The circuit therefore comprises an electrical bridge circuit in which the resistors 91 and 92 form two arms of a bridge and condenser 67 and 68 form the other two arms of the bridge. Any unbalance of this bridge is recorded by unit 101, such that a continuous record of any deviation in the capacitance of probe 67 from probe 68 is recorded. This arrangement is particularly useful because insulation 69 and the flowing liquid maintain probes 67 and 68 at the same temperature, thereby eliminating the effects of temperature variations from the below given dielectric constant formula. Recorder and controller 101 through the two electrical output leads 102 and 103 energizes solenoid 104 as a function of the electrical input to unit 101, solenoid 104 acting as a motor of motor valve 54 which may be disposed in line 27, or the other lines shown in Figures 2 to 7, respectively, so that the rate of flow of liquid in line 27 is a function of the difference in dielectric constant of the liquid flowing through pipe 23, as measured by probe 67, and a standard liquid in probe 68 maintained at the same temperature.

Whenever the temperature is maintained constant, as in Figure 1, it is unnecessary to have standard probe 68, and the device operates with the output of probe 53 being the only input to the recorder and controller 52 as shown in Figure 1, as will be obvious to those skilled in the art.

*Operation*

In Figure 1 the area of the opening through throttle valve 106 is set to restrict or to completely cut off the flow through recycle line 26, and thereby the proportion of flow of the fluid being circulated in line 23 by pump 24 through lines 26 and 27 is regulated as a function of the dielectric constant of liquid 56 by dielectric recorder controller 52 varying the opening of valve 54, whereby the rate of recycle of concentrated solution through line 26, and the rate of withdrawal of product through line 27, are controlled. Heater 14A is only supplemental, or is cut off by valve 63A. The temperature in the system is maintained constant by temperature recorder controller 61 varying the amount of heating fluid 62 flowing through a heater 25 by means of valve 63. The liquid level in evaporator 19 is maintained by liquid level control 57 regulating valve 59. As the concentration of polymer in the solvent in line 27 is a function of the dielectric constant of liquid 56, the system controls evaporator 19 so that any pre-selected concentration is obtained in line 27.

Figure 2 operates in the same manner as Figure 1, except that a differential dielectric recorder controller 66 having an open probe 67 and a closed sample probe 68 as described above with reference to Figure 8 is employed. This has an advantage over Figure 1 in that the temperature controller 61 can fluctuate somewhat without adversely affecting the dielectric recorder controller. Also, as the control of valve 54 on product line 27, or of valve 106 on recycle line 26, are obvious alternatives, controller 66 is shown operating valve 106, as it may in any of the other Figures 1 and 3 to 8, if desired. However, as the recycle flow is generally greater than the product flow, it is generally preferred to control valve 54 instead of 106.

Figure 3 is equivalent to Figure 1 but has a slight advantage in that the liquid level control 57 is inclined to be more intermittent in operation than the dielectric controller 66, and therefore is made dependent thereon, it being better to operate reaction zone 4 as constant as possible, and pass fluctuations in feed, in line 27, to the further processing and solvent removal 28, which is generally better equipped to handle such fluctuations than the reaction zone 4.

Figure 4:
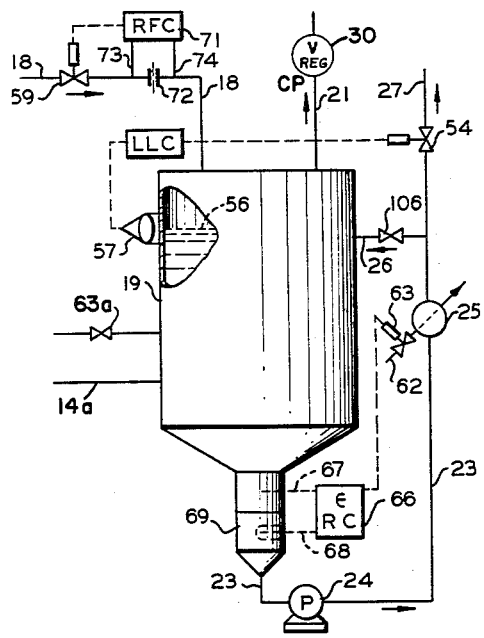
Figure 6:
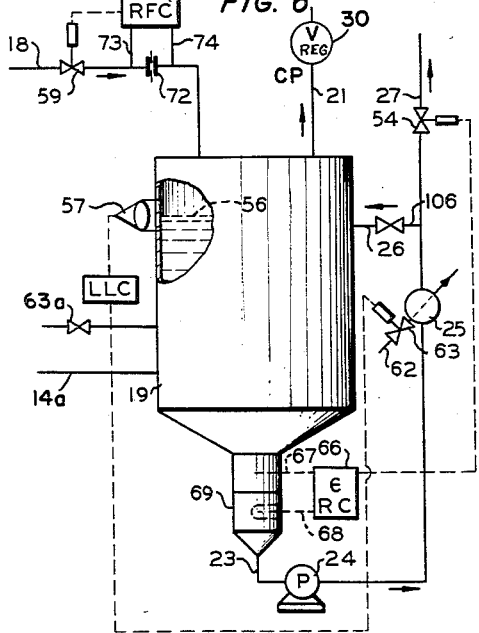
Figure 7:
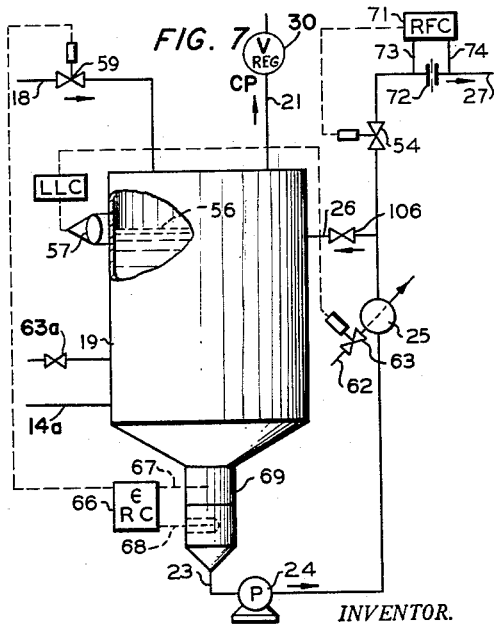

Figures 4 to 7 have an advantage over Figures 1 to 3 in that temperature recorder controller 61 has been eliminated, and the rate of flow controller 71 has been added. It is preferred to have the rate of flow controller 71 control valve 59 as shown in Figures 4 and 6, because this maintains a steady flow from reaction zone 4, permitting the maintenance of continuous uniform conditions therein. In some instances, however, it is preferred to supply a constant flow to the further processing and solvent removal 28, in which case the rate of flow controller 71 should control valve 54 as shown in Figures 5 and 7. It is preferred to have the liquid level control 57 control the remaining valve 54 or 59 in Figures 4 and 5, because it is believed the dielectric control 66 will regulate heater 25 with little possibility of overheating the liquid, but in some instances it is considered more desirable to reverse these two controls as shown in Figures 6 and 7 in order to provide a quicker response of the heating element 25 to the liquid level in evaporator 19.

In all of Figures 1 to 7 the operation of the controls is such that the system tends to maintain itself in a uniform condition at all points, and the advantages in any one of the modifications over the others are of a relatively minor nature, as all of the systems shown are useful in the practice of this invention.

While in Figure 1 the dielectric measurement is made at point 53 in the evaporator 19, and while in Figures 2 to 8 said measurement is made at point 67 in the outlet pipe 23 near the evaporator 19, it is believed obvious that useful results in practicing this invention may be obtained with the dielectric measurement made at any preselected point in the concentrated solution, anywhere it is located in outlet line 23 (before or after heater 25), recycle line 26 (before or after heater 25, if moved to line 26), or product line 27 (before or after valve 54). However, the location in heat insulated housing 69 at the outlet to evaporator 19 is preferred, because it gives a quicker response, measures the evaporator liquid effluent as it leaves the evaporator, and thereby gives a closer control of product concentration.

The rate of addition of solution through line 18 to evaporator 19, the rate of withdrawal of product through line 27, the rate of recycle of concentrated solution through line 26, and the temperature to which said concentrated solution is heated in heater 25, are each an operative variable of said system, and the process of concentrative evaporation can obviously be controlled by varying one of said operative variables in response to the changes in the dielectric constant of said concentrated solution measured at any selected point, as explained in the preceding paragraph.

Figure 1 of the accompanying drawing is a diagrammatic illustration of one embodiment of practicing the invention in connection with a polyethylene production process of the type described in the cited application of Hogan and Banks and in copending application Serial No. 445,042, filed July 22, 1954, now abandoned by Hogan and Francis.

In the system shown in Figure 1, solvent enters through inlet 2 and is mixed with catalyst supplied from storage zone 3. The catalyst can be, for example, chromium oxide supported on a silica-alumina gel and prepared as described in said M. R. Cines application. The catalyst particle size is sufficiently small to facilitate the formation of a slurry of catalyst in the solvent. A suitable range of particle size is from 20 to 100 mesh. The catalyst-solvent slurry passes into reaction zone 4. Ethylene enters the system through inlet 5 and passes into the reaction zone 4 wherein it is mixed with the catalyst and the solvent at a temperature, for example, of approximately 275° F. The solvent can be 2,2,4-trimethylpentane. The proportions of solvent and ethylene are so adjusted that the concentration of polymer in the reaction mixture does not exceed approximately 15 percent and preferably is in the range from 5 to 10 weight per cent. The pressure in reaction zone 4 is sufficient to maintain the solvent substantially in the liquid phase and can be, for example, 500 p.s.i. The reaction mixture is maintained in a state of turbulence so that the catalyst is maintained in a substantially uniform suspension or slurry in the reaction mixture. This turbulence can be obtained by jet action of incoming ethylene through inlet 5 and/or by the use of a mechanical stirrer indicated by the numeral 6 and driven by a suitable motor M. The reaction zone effluent which comprises a mixture of polymer, solvent, and suspended catalyst, together with small amounts of unreacted and/or inert gas, is passed through conduit 7 and heater 8 to dissolution zone 9. Additional solvent can be added through conduit 11, if desired, in order to adjust the concentration to a suitably low value of 2 to 10 weight percent, previously stated, so that the viscosity is not too high for efficient agitation. In dissolution zone 9, the mixture is maintained in a state of turbulence, as, for example, by means of a mechanical stirrer 13 driven by a motor M and the temperature is maintained, for example, by the use of heater 14 at from 300 to 325° F., i.e., somewhat higher than that utilized in reaction zone 4. The pressure is sufficient to maintain the solvent substantially in the liquid phase, but is preferably lower than that in reaction zone 4 to facilitate the evolution of dissolved gas, including unreacted ethylene, which is vented through outlet 15. Heater 14 is of any suitable design known in the art; for example, it can be a steam jacket around zone 9, or a steam coil therein, or an electric jacket around zone 9, or an electric immersion heater, or any liquid chemical heater of the prior art. Effluent from dissolution zone 9 passes through conduit 10 to solids removal zone 16. The material passed through conduit 10 is a homogeneous solution of substantially all of the polymer in the iso-octane solvent, which solution contains suspended solid catalyst. Solids removal zone 16 comprises any suitable equipment or combination thereof known in the art for the removal of suspended solids from liquids. For example, it can be a filter or a centrifuge. It should be suitable for operation under pressure in order to maintain the solvent in the liquid phase during the filtration. Catalyst removed by the filtration is withdrawn from the system through conduit 17. The withdrawn catalyst can be regenerated or reactivated, if desired, and recycled to catalyst storage zone 3 by means not shown in the drawings. The solution which has been freed of suspended solids is passed through conduit 18 to evaporation zone 19 which is ordinarily in the form of a flash evaporation tank and is operated, for example, at a temperature of 290° F. and a pressure of 33 p.s.i.g. maintained by any conventional means such as constant pressure inlet valve 30. Approximately half of the solvent is evaporated in zone 19, and the evaporated solvent is passed through conduit 21 and condenser 20. The condensed solvent is then returned through conduits 22 and 2. The residue from evaporation zone 19 is passed through conduit 23, pump 24 and heat exchanger 25 wherein the temperature is raised, for example, to 310° F. Part of the solution is returned through conduit 26 to evaporation zone 19. This mode of operation allows outside heating of the unvaporized material from evaporation zone 19 and is a preferred method of supplying heat to said zone, since it is ordinarily harder to supply heat efficiently directly to the interior of zone 19 on account of the physical characteristics of the polymer-solvent solution, however, it can be done with any internal heating element, which has been given the numeral 14a because it can be any heater for liquid chemicals of the prior art as described above in discussing heater 14 in zone 9. Heater 14a can be similarly employed in any of Figures 2 to 7 to supplement or replace heater 25 as described, as indicated by the dotted control lines in Figure 3, running to valves 63 and 63a, is not being regarded as necessary to show this in every figure of the drawings.

The remainder of the unvaporized material is passed through conduit 27 to further processing and solvent removal 28 which may be of any type known to the prior art, such as shown in said copending application of M. R. Cines, cited above, for example. Obviously processes 28 may include further evaporation units of the same type as 19, if desired, or it may not. The solution in pipe 27 entering zone 28 has a concentration, for example, of 10 weight percent polyethylene in the isooctane solution.

The formula for the variation of the dielectric constant of a material with temperature is: $\epsilon_t' = \epsilon_{t-a}(t'-t)$. For example, cyclohexane has a dielectric constant at 68° F. of 2.023 (at temperature "$t$") and at 77° F. (temperature "$t'$") of 2.015 and the temperature compensation factor "$a$" is therefore 0.00088. Isooctane (2,2,4-trimethylpentane) has a dielectric constant, similar in value, of 1.94 at 68° F. (room temperature). The polyethylene polymer, produced under the above described conditions in the above described process, has a dielectric constant at 68° F. (room temperature) of 2.37. Therefore, at 300° F., a 10% by weight change in concentration of the polyethylene polymer changes the dielectric constant of a solution of said polymer in cyclohexane, or isooctane, about 1.3%. In this general range, it has been found that the relationship of dielectric constant to percent concentration is a substantial straight line function, with percent polymer as the ordinate and the instrument reading as the abscissa. This proportional straight line function has sufficient slope so that a change of 0.1 weight percent polymer in the solution gives a sufficient change in instrument reading to actuate control instruments. At about 1%, the polymer concentration can be read to within 0.1%.

It will be obvious to those skilled in the art of recording and control instruments, from the accompanying description of Figure 8 below, how to calibrate and adjust the instruments involved in order to obtain the best results, and maintain any desired pre-selected polymer concentration of the selected polymer in the selected solvent, there being tables of dielectric constants, such as National Bureau of Standards circular 514 issued August 10, 1951, giving such constants for the solvents, but not for the polyolefin polymer, and it being easy to run calibration tests on different concentrations of the selected polymer and solvent. For example, with one polyethylene normally solid polymer in solution in cyclohexane at 307° F. the calibration curve of percent by weight polyethylene "$x$" to instrument reading "$y$" was: $x = 0.375y - 7.25$.

In the further processing and solvent removal steps, indicated diagrammatically at 28, the polymer solution 27 of pre-selected concentration is separated into solid polymer 29 which may be discharged through pipe 32 into storage 33, solvent which may be returned through line 34 and condensed and cooled in condenser 36 for recycle through line 22, and such gas as is produced may be relieved through vent line 37.

While the above is the preferred mode of operation of the process shown in Figure 1 with valves 38 and 39 closed, it is obvious that the operation of evaporation zone 19 is not dependent upon the operation of dissolution zone 9 and/or solid removal zone 16, as the catalyst can pass from line 18 through evaporation zone 19 and out the liquid effluent line 27 without affecting the operation of evaporator 19. This catalyst can then become an integral part of the solid polymer product 29, as some of the uses of the product are not impaired by the presence of catalyst in the product. Therefore valves 38, 39, 41, 42, 43, 44 and 46 and lines 47, 48 and 49 have been shown, so that by opening certain obvious ones of said valves and closing others the effluent from line 7 can be made to pass through zones 9 and 16 as described above, can be made to bypass zone 16 through line 49, to bypass zone 9 through lines 47, 48 and 49 with valves 43 and 46 closed, or can be made to bypass both zones 9 and 16 by closing valves 42 and 44 and opening valves 38 and 43 in line 47. When zone 9 is bypassed it is preferable to then have a gas relief line 51 provided on reaction zone 4 as gas relief line 15 is cut off by valve 42.

The dielectric control system for evaporator 19 in Figure 1 comprises a dielectric recorder controller 52 having the legend $\epsilon RC$ which has a suitable dielectric detection element, or probe, 53. Controller 52 varies the opening of valve 54 in line 27 as a function of the dielectric constant of the liquid 56 in contact with probe 53 in evaporator tank 19. At the same time liquid level control 57 in response to movement of a float on the surface of liquid 56 operates valve 59 to control the flow through line 18 entering tank 19, and temperature recorder controller 61 controls the flow of heating fluid in line 62 of indirect heat exchange heater 25 by operating valve 63 in response to the temperature of liquid 56 as determined by probe 64 which actuates controller 61 so as to maintain a constant temperature in evaporator tank 19.

In Figure 1 liquid level control 57 is maintaining a constant liquid level 56, temperature recorder controller 61 is maintaining a constant temperature in liquid 56, and by varying valve 54 as a function of the dielectric constant of liquid 56 the polymer concentration in effluent 27 is maintained at a pre-selected weight percentage.

In Figure 2 the control system is the same as in Figure 1 except that the temperature control 61 has been moved to a higher elevation in tank 19 and the dielectric recorder controller 66 is of a different type than 52 of Figure 1, recorder 66 having a pair of dielectric probes 67 and 68 which are disposed in a special outlet section 69 connecting at bottom of tank 19 with conduit 23. Dielectric probe 67 is in the liquid flowing from tank 19 through outlet section 69 to line 23, whereas dielectric probe 68 is exposed to the same temperature but is not in communication with said liquid, being instead a sealed standard sample cell of the type more fully described below with reference to Figure 8. It will be noted that the recorder controller in Figures 3 to 7 are also preferably of the type of controller 66 of Figure 2. As the other parts in Figure 2 are the same as in Figure 1 it is believed further description is unnecessary.

Figure 3 differs from Figure 2 only in that the liquid level control 57 has been rearranged to control valve 54 while dielectric recorder controller 66 has been rearranged to control valve 59.

Figure 4 employs a different system of control in which the liquid level control 57 operates valve 54, and valve 59 is operated by a rate of flow controller 71 so that the flow through line 18 into tank 19 is constant. Rate of flow controller 71 may be actuated by the pressure drop across orifice 72 transmitted thereto through pipes 73 and 74. The dielectric recorder controller 66 varies the amount of heating fluid passing through heater 25 by operating valve 63. It will be noted that no temperature controller is employed in the system of Figure 4. As the dielectric of liquids vary with the temperature it is essential in the modifications not employing a temperature controller that the differential dielectric instrument 66 be employed to compensate for temperature changes, whereas in the figures employing a temperature controller 61 it is not necessary that differential dielectric controller 66 be used, as the dielectric controller 52 of Figure 1 having a single dielectric probe 53 may be employed as the temperature of the liquid 56 is kept constant. However, because of the possibilities of temperature variations existing in spite of the action of temperature controller 61 to eliminate the same, it is preferred to use the differential dielectric controller 66 in all instances.

Figure 5 is identical to Figure 4 except that the liquid level control 57 is controlling valve 59 and the rate of flow controller 71 has been shifted to line 27 to control valve 54.

Figure 6 is identical to Figure 4 except that liquid level control 57 has been shifted to control valve 63 and dielectric controller 66 has been shifted to control valve 54.

Figure 7 is the same as Figure 6 except that differential dielectric controller 66 has been shifted to control valve 59 and rate of flow controller 71 has been shifted to line 27 to control valve 54.

Although the process of this invention has been described in connection with a particular polyethylene process, it is clearly not limited thereto but is also applicable to any evaporative concentration process, provided that solvent and the dissolved or suspended matter have different dielectric constants. Thus the process is also applicable to solutions of polybutadienes, especially hydrogenated polybutadienes as described in copending application Serial No. 395,291, filed November 30, 1953, now U.S. Patent 2,864,809 of December 16, 1958, by Jones and Moberly, polystyrene, polypropylenes, polyisobutylenes, and polyethylenes produced by processes other than that of the type described herein, as well as to the recovery of halogenated polyethylenes. Also, the process is not limited to the recovery of polymers from saturated hydrocarbon solvents but is applicable where solvents such as chloroform, carbon tetrachloride, carbon disulfide, and aromatic hydrocarbons and derivatives thereof are used as solvents. Variation and modification are possible within the scope of the disclosure and the claims.

When heater 25 is an electric heater, instead of the hot fluid heater shown, the heating fluid inlet valve 63 is then replaced by its electrical equivalent, such as a rheostat (not shown) and is controlled to vary the heating by solenoid 104 of Figure 8. When heater 25 is omitted, and heater 14A is used alone, similar changes to valve 63 as described in the last sentence are made instead to valve 63A of heater 14A.

Having described by invention, I claim:

1. The process of concentrating a relatively dilute liquid solution, of a less volatile material in a more volatile liquid solvent having a dielectric constant measurably different from said material, to form a product of a predetermined percentage concentration, comprising adding said dilute solution to an evaporating zone, evaporating said solvent from said solution in said evaporating zone and removing said evaporated solvent from said zone to leave behind a concentrated solution of said predetermined concentration, withdrawing said concentrated solution from said evaporating zone, heating said withdrawn concentrated solution, recycling a first portion of the same to said evaporating zone, removing the remaining second portion of said withdrawn concentrated solution as said product, and maintaining a constant liquid level in said zone, in which process the rate of addition of dilute solution, rate of recycle of concentrated solution, temperature of recycled solution, and rate of removal of product, are operative variables, measuring a function of the dielectric constant of said concentrated solution at a selected point and varying a selected one of said operative variables in response to said measurement, one of the remaining variables being held constant, another being responsive to said liquid level to maintain said liquid level constant, and the remaining operative variable being inherently adjusted so that the sum of the recycle rate and the product rate is equal to the rate of withdrawal of said concentrated solution from said evaporating zone, whereby said product is maintained at a predetermined percentage concentration.

2. The process of claim 1 in which the improvement comprises including the steps in which the function of the dielectric constant of said concentrated solution is measured by electrically comparing the dielectric constant of said concentrated solution with the dielectric constant of a sample solution of desired concentration in a closed sample zone at substantially the same temperature.

3. The process of claim 1 in which the less volatile material is a polymer selected from the group consisting of polybutadienes, hydrogenated polybutadienes, polystyrenes, polyisobutylenes, halogenated polyethylenes, and a polymer of an aliphatic 1-olefin having a maximum chain length of 8 carbon atoms and no branching nearer the double bond than the 4 position, and the solvent is selected from the group of normally liquid solvents consisting of chloroform, carbon tetrachloride, carbon disulfide, naphthenes, and paraffinic hydrocarbons having from 5 to 12 carbon atoms per molecule.

4. The process of claim 1 in which the improvement comprises including the steps in which the process variable varied in response to the dielectric measurement is the rate of withdrawal of product.

5. The process of claim 1 in which the improvement comprises including the steps in which the process variable varied in response to the dielectric measurement is the temperature of the recycled solution.

6. The process of claim 1 in which the improvement comprises including the steps in which the process variable varied in response to the dielectric measurement is the rate of addition of dilute solution.

7. The process of claim 1 in which the improvement comprises including the steps in which the process variable varied in response to the dielectric measurement is the rate of recycle of concentrated solution.

8. The process of claim 1 in which the improvement comprises the steps of controlling the rate of withdrawal of product in proportion to said dielectric measurement, controlling the addition of dilute solution to maintain a constant liquid level in said evaporation zone, and controlling the temperature of said recycle to maintain a constant temperature in said evaporation zone.

9. The process of claim 1 in which the improvement comprises the steps of controlling the rate of recycle of concentrated solution in proportion to said dielectric measurement, controlling the rate of addition of said dilute solution to maintain a constant liquid level in said evaporation zone, and controlling the temperature of said recycle to maintain a constant temperature in said evaporation zone.

10. The process of claim 1 in which the improvement comprises the steps of controlling the rate of addition of dilute solution in proportion to said dielectric measurement, controlling the rate of withdrawal of product to maintain a constant liquid level in said evaporation zone, and controlling the temperature of said recycle to maintain a constant temperature in said evaporation zone.

11. A process of claim 1 in which the improvement comprises the steps of controlling the rate of addition of dilute solution to maintain a constant liquid level in said evaporation zone, controlling the rate of withdrawal of product at a constant rate, and controlling the temperature of said evaporation zone by controlling the temperature of said recycle in proportion to said dielectric measurement.

12. The process of claim 1 in which the improvement comprises the steps of controlling the rate of addition of dilute solution in proportion to said dielectric measurement, controlling the rate of product withdrawal at a constant rate, and controlling the temperature of said recycle directly in proportion to the liquid level in said evaporation zone to maintain a constant liquid level therein.

13. The process of claim 1 in which the less volatile material is polyethylene and the solvent is cyclohexane.

14. The process of claim 1 in which the less volatile material is a polybutadiene and the solvent is an aromatic hydrocarbon.

15. The process of claim 1 in which the less volatile material is a polymeric hydrocarbon and the more volatile material is a normally liquid solvent therefore.

16. In a process in which a less concentrated polymer solution in a first conduit is concentrated and flowed through a second conduit, the process of controlling the flow of said less concentrated polymer solution in a first conduit of a liquid solution of a polymer selected from the group consisting of polybutadienes, hydrogenated polybutadienes, polystyrenes, polyisobutylenes, halogenated polyethylenes, and a polymer of an aliphatic 1-olefin having a maximum chain length of 8 carbon atoms and no branching nearer the double bond than the 4 position in a solvent selected from the group of normally liquid solvents consisting of chloroform, carbon tetrachloride, carbon disulfide, naphthenes, and paraffinic hydrocarbons having from 5 to 12 carbon atoms per molecule, comprising measuring the dielectric constant of said more concentrated polymer solution in said second conduit, producing an electrical output directly proportional to the concentration of said polymer in said solution in said second conduit, and employing said electrical output to control said flow in said first conduit directly in proportion to said electrical output.

17. The process of evaporating solvent from a liquid solution of a polymer selected from the group consisting of polybutadienes, hydrogenated polybutadienes, polystyrenes, polyisobutylenes, halogenated polyethylenes, and a polymer of an aliphatic 1-olefin having a maximum chain length of 8 carbon atoms and no branching nearer the double bond than the 4 position in a solvent selected from the group of normally liquid solvents consisting of chloroform, carbon tetrachloride, carbon disulfide, naphthenes, and paraffinic hydrocarbons, having from 5 to 12 carbon atoms per molecule, comprising maintaining a body of said solution in a closed zone, maintaining a constant liquid level in said zone by adding said solution as needed in response to said liquid level, withdrawing concentrated solution from said zone, measuring the dielectric constant of said withdrawn solution and adding heat thereto in proportion to said dielectric constant, removing a portion of said withdrawn solution at a constant flow rate as the product of said evaporating process, and recycling the remainder of said heated withdrawn solution to said body of solution in said closed zone as a source of heat for said evaporation process.

18. The process of evaporating solvent from a liquid solution of a polymer in a solvent, comprising maintaining a body of said solution in a closed zone at a temperature sufficient to vaporize solvent therefrom, maintaining a constant liquid level in said zone by adding said solution as needed in response to said liquid level, withdrawing concentrated solution from said zone, measuring the dielectric constant of said withdrawn solution and adding heat thereto in proportion to said dielectric constant, removing a portion of said withdrawn solution at a constant flow rate as the product of said evaporating process, and recycling the remainder of said heated withdrawn solution to said body of solution in said closed zone as a source of heat for said evaporation process.

19. The process of concentrating a relatively dilute liquid solution, of a less volatile material in a more volatile liquid solvent having a dielectric constant measurably different from said material, to form a product of a predetermined percentage concentration comprising adding said dilute solution in controlled amounts to an evaporating zone, supplying heat to said solution in said zone, removing said evaporated solvent from said zone to leave therein a concentrated solution having said predetermined concentration, withdrawing said concentrated solution as said product from said evaporating zone, in which process the rate of addition of dilute solution, temperature of said solution in said evaporating zone, and rate of withdrawal of product, are operative variables, measuring the dielectric constant of said concentrated solution at a selected point and varying at least one of said operative variables in response thereto, whereby said product is maintained at said predetermined percentage concentration.

References Cited in the file of this patent

UNITED STATES PATENTS

| 1,734,699 | Wait | Nov. 5, 1929 |
| 1,883,211 | Wilson | Oct. 18, 1932 |
| 1,951,035 | Parker | Mar. 13, 1934 |
| 2,135,512 | Holven | Nov. 8, 1938 |

(Other references on following page)

UNITED STATES PATENTS

| | | |
|---|---|---|
| 2,135,513 | Holven | Nov. 8, 1938 |
| 2,221,000 | Kuentzel et al. | Nov. 12, 1940 |
| 2,304,150 | Crawford | Dec. 8, 1942 |
| 2,540,146 | Stober | Feb. 6, 1951 |
| 2,576,253 | Farrell et al. | Nov. 27, 1951 |
| 2,599,583 | Robinson et al. | June 10, 1952 |
| 2,650,660 | Martin et al. | Sept. 1, 1953 |
| 2,663,308 | Hodgens | Dec. 22, 1953 |
| 2,777,514 | Eckstrom | Jan. 15, 1957 |

FOREIGN PATENTS

| | | |
|---|---|---|
| 682,254 | Great Britain | Nov. 5, 1952 |

OTHER REFERENCES

Handbook of Mechanical Engineering, O. W. Eschbach, 2nd ed., pages 9–39, John Wiley & Sons, Inc., N.Y.